(12) United States Patent
Liu

(10) Patent No.: US 9,690,127 B2
(45) Date of Patent: Jun. 27, 2017

(54) ELECTRONIC DEVICE

(71) Applicant: Lenovo (Beijing) Co., Ltd., Beijing (CN)

(72) Inventor: Ke Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 199 days.

(21) Appl. No.: 14/564,572

(22) Filed: Dec. 9, 2014

(65) Prior Publication Data

US 2015/0378197 A1    Dec. 31, 2015

(30) Foreign Application Priority Data

Jun. 26, 2014   (CN) .......................... 2014 1 0299796

(51) Int. Cl.
*G02F 1/1335* (2006.01)
*G02F 1/133* (2006.01)
*G02F 1/1333* (2006.01)
*H04M 1/02* (2006.01)

(52) U.S. Cl.
CPC ........ *G02F 1/1333* (2013.01); *H04M 1/0266* (2013.01); *G02F 2201/58* (2013.01); *H04M 2250/12* (2013.01)

(58) Field of Classification Search
CPC  G02F 1/1333; G02F 2201/58; H04M 1/0266; H04M 2250/12
See application file for complete search history.

(56) References Cited

U.S. PATENT DOCUMENTS

| 2005/0067553 A1* | 3/2005 | Agari | G02F 1/1336 250/205 |
| 2009/0122039 A1* | 5/2009 | Katoh | G02F 1/136227 345/207 |
| 2009/0167675 A1* | 7/2009 | Park | G02F 1/13452 345/102 |
| 2011/0069254 A1* | 3/2011 | Takama | G02B 3/14 349/62 |
| 2011/0148834 A1* | 6/2011 | Baek | G09G 3/3406 345/207 |

* cited by examiner

*Primary Examiner* — Ryan Crockett
(74) *Attorney, Agent, or Firm* — Harness, Dickey & Pierce, P.L.C.

(57) ABSTRACT

An electronic device includes: a main body of the electronic device; a display, provided on the main body of the electronic device, where the display includes a first light transmitting layer, and a support layer between the main body of the electronic device and the first light transmitting layer, and where the first transmitting layer is located on a first surface of the electronic device; N sensors, provided in the display, and located inside the first transmitting layer, wherein a capturing module of the N sensors faces an inner surface of the first transmitting layer; and the N sensors are adapted to capture ambient light penetrating the first light transmitting layer or ambient light irradiating the N sensors via a through hole of the first light transmitting layer.

8 Claims, 3 Drawing Sheets

ELECTRONIC DEVICE

CROSS-REFERENCE TO RELATED APPLICATION

This application claims priority to Chinese Patent Application No. 201410299796.5, entitled "ELECTRONIC DEVICE", filed with the Chinese Patent Office on Jun. 26, 2014, which is incorporated by reference in its entirety herein.

FIELD OF THE TECHNOLOGY

The present application relates to the field of electronic technology, particularly to an electronic device.

BACKGROUND

As development of science and technology, more and more electronic devices come into people's lives. The electronic devices, such as smart phones, tablets, laptops, and smart televisions, bring lots of conveniences into people's lives.

A user often uses the electronic device to make friends, play games, take photos, etc. To be easy to use these services and enrich operation types of these services in usage, a sensor, such as a camera, a light sensor and a distance sensor, is generally provided at the electronic device.

However, at least following technical problems is found in the above technology.

Currently, the sensor is generally arranged at a main board, and then the sensor may capture ambient light by opening a hole at a surface of the electronic device.

Thus, a conventional sensor occupies an area of the main board, resulting in a technical problem of a low utilization rate for the area of the main board.

SUMMARY

In some embodiments of this disclosure, an electronic device includes a main body of the electronic device, a display, provided on the main body of the electronic device, where the display includes a first light transmitting layer, and a support layer between the main body of the electronic device and the first light transmitting layer, and where the first transmitting layer is located on a first surface of the electronic device; N sensors, provided in the display, and located inside the first light transmitting layer, where a capturing module of the N sensors faces an inner surface of the first light transmitting layer; the N sensors are adapted to capture ambient light penetrating the first light transmitting layer or ambient light irradiating the N sensors via a through hole of the first light transmitting layer, and where N is a positive integer.

DETAILED DESCRIPTION OF THE EMBODIMENTS

An electronic device is provided according an embodiment of the application, to achieve a technical effect of increasing an area utilization rate of a main board.

In order to solve the above technical problem of a low utilization rate resulted from a fact that a conventional sensor occupies an area of the main board, technical solutions as follows are provided in embodiments of the application.

An electronic device is provided in the application, includes:

a main body of the electronic device;

a display, provided on the main body of the electronic device, where the display includes a first light transmitting layer, and a support layer between the main body of the electronic device and the first light transmitting layer, and where the first transmitting layer is located on a first surface of the electronic device;

N sensors, provided in the display, and located inside the first light transmitting layer, where a capturing module of the N sensors faces an inner surface of the first light transmitting layer; the N sensors are adapted to capture ambient light penetrating the first light transmitting layer or ambient light irradiating the N sensors via a through hole of the first light transmitting layer, and where N is a positive integer.

With above solution, a technical effect of increasing an area utilization rate of the main board is achieved by integrating the sensors in the display, without occupying an area of the main board in the main body of the electronic device.

To better explain the above technical solutions, the foregoing technical solutions are described below in detail in combination with drawings of the specification and embodiments. It should be understood that the embodiments of the application and features in the embodiments are for detailed description of the technical solutions in the application, rather than limits to the technical solutions in the application. Except for conflicting, the embodiments of the application and the features in the embodiments can be combined with each other.

An electronic device is provided in the embodiment. In an implementation, the electronic device may be a cell phone, a tablet, a smart watch, a laptop, etc., which are not further enumerated in the embodiment.

Figure 1:
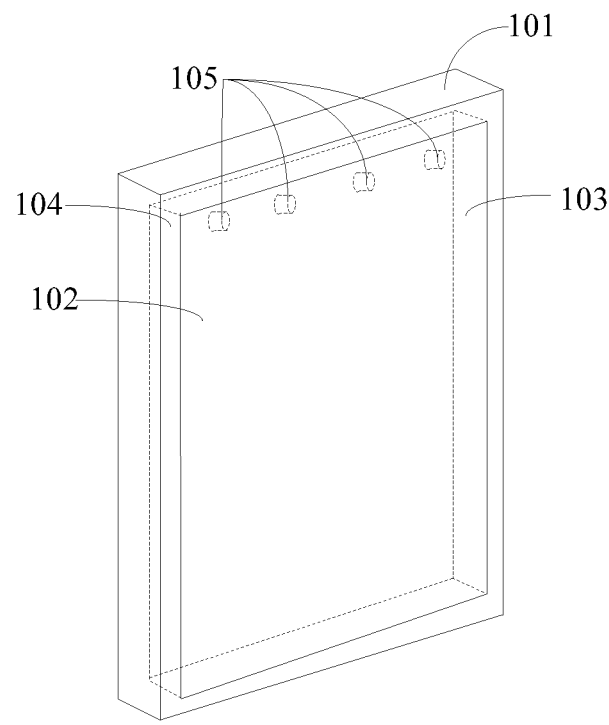
FIG. 1 is a structural diagram of an electronic device according to a first embodiment of the application.
Figure 2A:
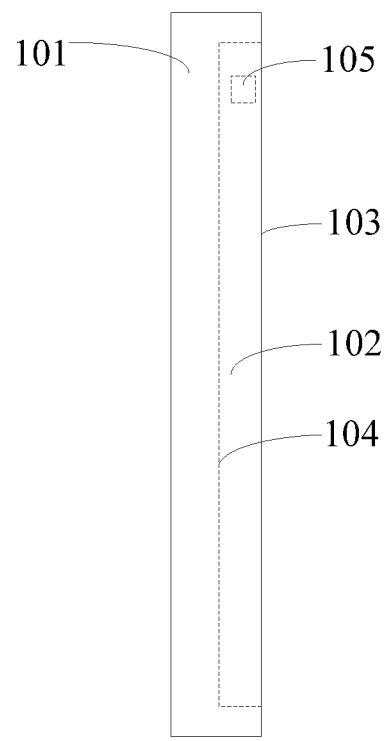
FIG. 2A and FIG. 2B are side views of electronic devices according to embodiments of the application.
Figure 2B:
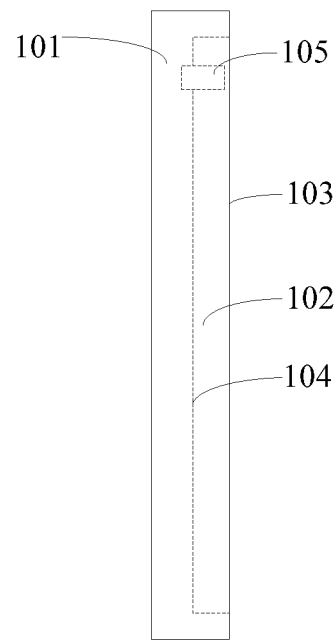

Referring to FIG. 1, FIG. 2A and FIG. 2B, FIG. 1 is a main structural diagram of the electronic device according to the embodiment of the application, and FIG. 2A and FIG. 2B are side views of the electronic device according to the embodiment of the application. The electronic device includes:

a main body 101 of the electronic device;

a display 102, provided on the main body 101 of the electronic device, where the display 102 includes a first light transmitting layer 103, and a support layer 104 between the device main body 101 and the first light transmitting layer 103, and where the first transmitting layer 103 is located on a first surface of the electronic device;

N sensors 105, provided in the display 102, and located inside the first transmitting layer 103, where a capturing module of the N sensors 105 faces an inner surface of the first transmitting layer 103; the N sensors 105 are adapted to capture ambient light penetrating the first light transmitting layer 103 or ambient light irradiating the N sensors 105 via a through hole of the first light transmitting layer 103, and where N is a positive integer.

Next, the electronic device according to the application is introduced in three sections, i.e., the main body 101 of the electronic device, the display 102, and a communication connection between the display 102 and the main body 101 of the electronic device.

In a first section, the main body 101 of the electronic device is introduced.

The main body 101 of the electronic device includes a case, and a main board provided inside the case.

Figure 3:
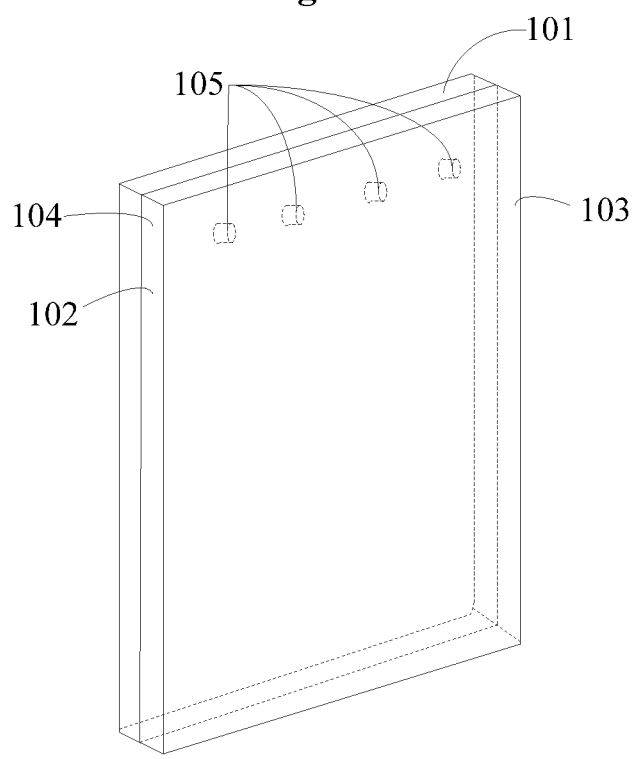
FIG. 3 is a structural diagram of an electronic device according to a second embodiment of the application.

The case may be extended to enclose an edge of the display 102, as shown in FIG. 1. Thus, the display 102 is fixed and protected from damages resulted from collisions. The case may also enclose only components inside the main body 101 of the electronic device, and the display 102 is stuck onto the main body 101 of the electronic device, as shown in FIG. 3, which will not be limited in the embodiment.

In a second section, the display 102 is introduced.

Figure 4:
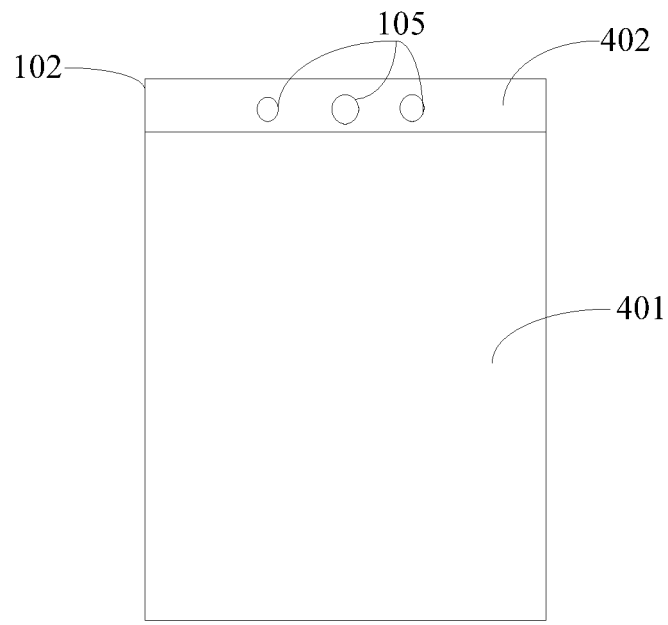
FIG. 4 is a diagram of a display region and a sensor arrangement region according to an embodiment of the application.

As shown in FIG. 4, the display 102 includes: a display region 401 and a sensor arrangement region 402. The N sensors 105 are arranged in the sensor arrangement region 402.

In an embodiment of the application, the N sensors 105 are light sensors.

In an implementation, the N sensors 105 may include any one of a camera unit, a light detecting unit, and a distance sensor, or a combination thereof.

In an embodiment of the application, the N sensors 105 may be provided between the first light transmitting layer 103 and the support layer 104, as shown in FIG. 2A. Alternatively, the N sensors 105 may also penetrate the support layer 104, as shown in FIG. 2B, which will not be limited in the embodiment.

In an embodiment of the application, a distance between each of the N sensors 105 and a first edge of the first surface is less than a first threshold, as shown in FIG. 4.

In particular, the N sensors 105 are all arranged on one side of the surface of the electronic device, to avoid separating the N sensors 105 by the display region 401. In this way, a relatively large and integral display region is leaved to use as the display region 401 of the display 102.

In an embodiment of the application, in order to ensure a sensing accuracy of the N sensors 105, an opaque structure is arranged between each of the N sensors 105 and the display region 401 of the display 102, to shield the N sensors 105 from an interference of light of the display region 401.

Further, an opaque structure is arranged between two sensors of the N sensors 105, to shield light interference among the N sensors 105.

In an implementation, the opaque structure may be a structure made of opaque material with a transmittance lower than a preset value. Alternatively, a surface of the opaque structure may be covered with an opaque material with a transmittance lower than a preset value.

In particular, due to a small distance between each of the N sensors 105 and the display region 401, light emitted from the display region 401 may severely interfere with the N sensors 105 when the display region 401 is in a display state, which may cause a distortion of an image captured by the N sensors 105 or a distance misjudgment of the N sensors 105. Therefore, an opaque structure is arranged between each of the N sensors 105 and the display region 401 of the display 102. In this way, the interference of light from the display region 401 to the N sensors 105 can be effectively reduced, and a technical effect of improving sensing accuracy of the N sensors 105 is achieved.

In particular, the N sensors 105 may include a sensor with a light emitting function, such as a camera integrated with a flash. When the sensor with the light emitting function emits light, it inevitably produces interference to other sensors, and causes a distortion of an image captured by the other sensor and a distance misjudgment of the other sensor. Therefore, an opaque structure is arranged between two sensors of the N sensors 105, which can effectively reduce mutual interference among the sensors, and the technical effect of improving a sensing accuracy of the N sensors 105 is further achieved.

Next, taking a case that the display 102 is an LCD as an example, a position where the N sensors 105 are integrated in the LCD is described below in detail.

Figure 5:
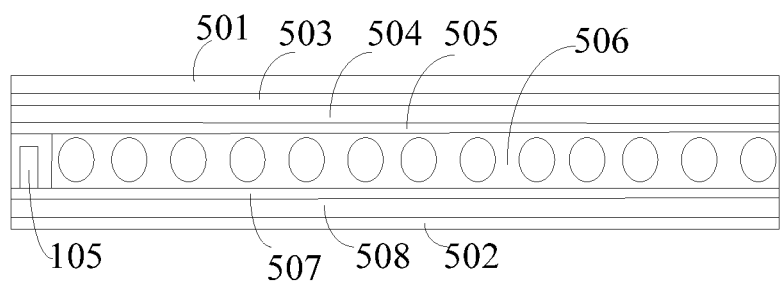
FIG. 5 is a structural diagram of a display according to an embodiment of the application, in the case that the display is an LCD.

FIG. 5 is a structural diagram of a display 102 according to the embodiment of the application, in a case that the display 102 is an LCD. As shown in FIG. 5, if the display 102 is the LCD, the first light transmitting layer 103 is a glass protective layer 501 at a surface of the LCD, and the support layer 104 is a bottom polarizer layer 502 of the LCD. The display 102 further includes in turn from the glass protective layer 501 to the bottom polarizer layer 502:

a top polarizer layer 503, a top glass layer 504, a top electrode layer 505, a liquid crystal layer 506, a bottom electrode layer 507, and a bottom glass layer 508.

The N sensors 105 are fixed between the top glass layer 504 and the bottom glass layer 508

In an implementation, the N sensors 105 should be fixed in the sensor arrangement region 402, in a process of forming the LCD. A special fixing method includes: fixing the N sensors 105 to the bottom glass layer 508 or the bottom electrode layer 507 by a dedicated adhesive.

In particular, because liquid crystal particles in liquid state are distributed in the liquid crystal layer 506 between the top glass layer 504 and the bottom glass layer 508, there is a space, between the top glass layer 504 and the bottom glass layer 508, enough to accommodate the N sensors 105.

In an implementation, the top glass layer 504 is made of transparent material with a high transmittance. Therefore, light can irradiates sensors by passing through the top glass layer 504, even if no holes opened in the top glass layer 504.

To improve a light transmittance and a sensitivity of the sensors, a glass layer through hole may be provided in a region of the top glass layer 504, where a distance between the region and each of the N sensors 105 is less than a second threshold. In this way, the N sensors 105 may capture ambient light irradiating the N sensors 105 via the glass layer through hole.

In an implementation, an opening process for the glass layer through hole may be an opening process with ink.

In an implementation, a block structure is provided between the liquid crystal layer 506 and the N sensors 105, to prevent the liquid crystal particles in liquid state in the liquid crystal layer 506 from flowing into the region where the N sensors 105 are located. A region covered by the liquid crystal layer 506 corresponds to the display region 401, and the region where the N sensors 105 are located corresponds to the sensor arrangement region 402.

Further, considering that the bottom electrode layer 507 may be adapted to transmit electric signals from/to the N sensors 105, the N sensors 105 may be fixedly provided between the top glass layer 504 and the bottom electrode layer 507. Alternatively, the N sensors 105 may be fixedly provided between the top electrode layer 505 and the bottom electrode layer 507.

In an implementation, because the top polarizer layer 503, the top glass layer 504 and the top electrode layer 505 of the LCD are made of transparent conductive material with a high transmittance, the top polarizer layer 503, the top glass layer 504 and the top electrode layer 505 may be provided to cover the display region 401 and the sensor arrangement region 402. That is, the N sensors 105 are fixedly provided between the top electrode layer 505 and the bottom electrode layer 507. Thus, the N sensors 105 may be protected by the top polarizer layer 503, the top glass layer 504 and the top electrode layer 505. Alternatively, any one of the top polarizer layer 503, the top glass layer 504, the top electrode layer 505 or a combination thereof may be provided to cover only the display region 401, rather than the sensor arrangement region 402. In this way, an intensity of light irradiating the N sensors 105 may be further improved. This is not limited in the embodiment.

In an implementation, a capturing module of the N sensors 105 faces an inner surface of the first transmitting layer 103. Thus, an intensity of light irradiating the N sensors 105 is not affected by the bottom glass layer 508 and the bottom polarizer layer 502. Therefore, the bottom glass layer 508 and the bottom polarizer layer 502 may be extended to support the display region 401 and the sensor arrangement region 402 as well as the N sensors 105. Alternatively, any one of the bottom glass layer 508 and the bottom polarizer layer 502, or a combination thereof may be extended to support only the display region 401, but not to cover the sensor arrangement region 402. This is not limited in the embodiment.

In an implementation, the display 102 may also be a Lighting Emitting Diode (LED) screen. If the display 102 is the LED screen, the first light transmitting layer 103 is a glass protective layer at a surface of the LED, the support layer 104 is a support layer of the LED, which is adapted to fix light-emitting components. The display 102 further includes:

a light-emitting component layer provided between the glass protective layer and the support layer;

where the N sensors 105 are fixedly provided on the support layer.

In a third section, a communication connection between the display 102 and the main body 101 of the electronic device is introduced.

In an embodiment of the application, in the case that the device main body 101 includes a main board, the electronic device further includes:

a Flexible Printed Circuit board FPC, connected with the main board and the display 102, where the N sensors 105 and the display 102 all communicate with the main board via the FPC.

In particular, the N sensors 105 use different interfaces to communicate with the main board via the FPC. For example, a camera sensor uses Mobile Industry Processor Interface (MIPI) to communicate with the main board via the FPC. A distance sensor and a light sensor use serial communication bus interface (Inter-Integrated Circuit (I2C)) to communicate with the main board via the FPC.

Further, a processor provided on the main board displays and receives images by receiving, via the FPC, signals transmitted by the sensors. The processor controls the sensors by transmitting control signals to the sensors.

Next, taking a case that the display 102 is an LCD as an example, the communication connection between the N sensors 105 and the main body 101 of the electronic device is described in detail.

Figure 6:
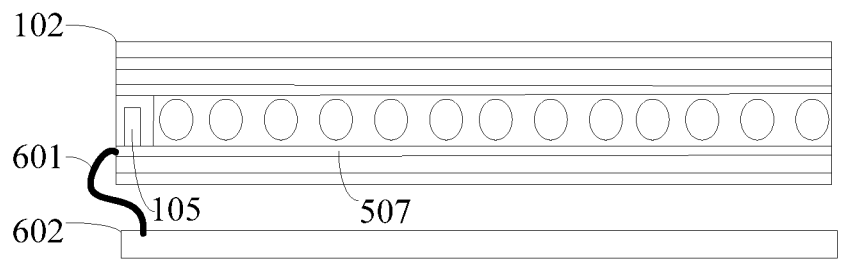
FIG. 6 is a diagram of a connection between a display and a main board according to an embodiment of the application, in the case that the display is an LCD.

As shown in FIG. 6, in an embodiment of the application, the N sensors 105 is fixed between the top glass layer 504 and the bottom electrode layer 507.

The N sensors 105 are electrically connected to one end of the FPC 601 via the bottom electrode layer 507. The other end of the FPC 601 is electrically connected to the main board, to implement a communication between the N sensors 105 and the main board 602.

In particular, if the display 102 is an LCD, the sensors are provided between the top glass layer 504 and the bottom electrode layer 507, and thus the sensors may be connected to the FPC 601 directly via the bottom electrode layer 507 and communicate with the main board 602, without a conductive layer provided especially for the sensors. Thus, an integration process of integrating the sensors to the display is reduced.

Technical solutions according to the above embodiments of the application have technical effects or advantages at least as follows.

1. In the electronic device according to the embodiments of the application, the sensors are integrated in the display, which will not occupy an area of the main board in the main body of the electronic device. Thus, a technical effect of increasing an area utilization rate of the main board is achieved.

2. In the electronic device according to some embodiments of the application, an opaque structure is arranged between the sensors and the display region. Therefore, an interference of light from the display region to the sensors is effectively reduced.

3. In the electronic device according to some embodiments of the application, the sensors are arranged between the top glass layer and the bottom electrode layer, when the display is the LCD. Thus, the sensors can be connected to the FPC directly via the bottom electrode layer, and communicate with the main board, without a conductive layer provided especially for the sensors. Thus an integration process of integrating the sensors to the display is reduced.

Although some embodiments of the application have been described, those skilled in the art may carry out other changes and modifications on these embodiments, once knowing the basic creative concept. Therefore, the appended claims intend to be construed as including the embodiments and all changes and modifications falling in the scope of the application.

Apparently, diverse modifications and transformations on the application may be carried out by those skilled in the art, without departing from the spirit and the scope of the application. Thus, if the modifications or the transformations are within the scopes of the claims of the application or the equivalent technology thereof, then the application intends to also include the modifications and the transformations.

The invention claimed is:

1. An electronic device, comprising:
  a main body of the electronic device;
  a display, provided on the main body of the electronic device, wherein the display comprises a first light transmitting layer, and a support layer between the main body of the electronic device and the first light transmitting layer, and wherein the first transmitting layer is located on a first surface of the electronic device;

N sensors, provided in the display, and located inside the first transmitting layer, wherein a capturing module of the N sensors faces an inner surface of the first transmitting layer; and the N sensors are adapted to capture ambient light penetrating the first light transmitting layer or ambient light irradiating the N sensors via a through hole of the first light transmitting layer, and wherein N is a positive integer;

wherein the display is a Liquid Crystal Display (LCD), the first light transmitting layer is a glass protective layer at a surface of the LCD, the support layer is a bottom polarizer layer of the LCD, and the display further comprises in turn from the glass protective layer to the bottom polarizer layer:

a top polarizer layer, a top glass layer, a top electrode layer, a liquid crystal layer, a bottom electrode layer, and a bottom glass layer, and wherein the N sensors are fixedly provided between the top glass layer and the bottom glass layer.

2. The electronic device according to claim 1, wherein a distance between each of the N sensors and a first edge of the first surface is less than a first threshold.

3. The electronic device according to claim 1, wherein an opaque structure is provided between two sensors of the N sensors, to shield light interference among the N sensors.

4. The electronic device according to claim 1, wherein the main body of the electronic device comprises a main board, the electronic device further comprises:

a Flexible Printed Circuit board (FPC), connected with the main board and the display, wherein the N sensors and the display all communicate with the main board via the FPC.

5. The electronic device according to claim 1, wherein the N sensors are fixedly provided between the top glass layer and the bottom electrode layer, and wherein the N sensors are electrically connected to the FPC via the bottom electrode layer.

6. The electronic device according to claim 1, wherein a glass layer through hole is provided in a region of the top glass layer, wherein a distance between the region and each of the N sensors is less than a second threshold, and wherein the N sensors are adapted to capture ambient light irradiating the N sensors via the glass layer through hole.

7. The electronic device according to claim 1, wherein the N sensors are light sensors.

8. The electronic device according to claim 1, wherein an opaque structure is provided between each of the N sensors and a display region of the display, to shield the N sensors from an interference of light of the display region.

* * * * *